United States Patent [19]
Olsson

[11] Patent Number: 5,671,978
[45] Date of Patent: Sep. 30, 1997

[54] VEHICLE SEAT CUSHION

[75] Inventor: Lars-Eric Verner Olsson, Sjuntorp, Sweden

[73] Assignee: Lear Corporation, Southfield, Mich.

[21] Appl. No.: 672,645

[22] Filed: Jun. 28, 1996

[51] Int. Cl.$^6$ .................................................. A47C 7/02
[52] U.S. Cl. ................ 297/452.55; 297/335; 297/216.1
[58] Field of Search ........................ 297/452.55, 216.1, 297/335, 336, 337, 452.57, DIG. 1; 296/65.1, 68.1

[56] References Cited

U.S. PATENT DOCUMENTS

| | | |
|---|---|---|
| 2,796,112 | 6/1957 | Barksy . |
| 2,833,339 | 5/1958 | Liljengren . |
| 3,337,260 | 8/1967 | Proctor . |
| 3,885,810 | 5/1975 | Chika . |
| 4,057,214 | 11/1977 | Harder, Jr. . |
| 4,512,604 | 4/1985 | Maeda et al. . |
| 4,688,662 | 8/1987 | Correll . |
| 4,834,451 | 5/1989 | Meunier et al. ............... 297/452.55 |
| 4,880,276 | 11/1989 | Shovar ............... 297/492.55 |
| 4,919,487 | 4/1990 | Gibbs . |
| 5,240,310 | 8/1993 | Rink . |
| 5,447,360 | 9/1995 | Hewko et al. . |
| 5,462,339 | 10/1995 | Schmale et al. . |

FOREIGN PATENT DOCUMENTS

| | | | |
|---|---|---|---|
| 2005633 | 9/1971 | Germany ............... 297/335 |
| 378462 | 2/1940 | Italy ............... 297/335 |
| 2087226 | 5/1982 | United Kingdom ............... 297/216.1 |
| 2201088 | 8/1988 | United Kingdom ............... 297/452.55 |

*Primary Examiner*—Laurie K. Cranmer
*Attorney, Agent, or Firm*—Howard & Howard

[57] ABSTRACT

In a vehicular seat assembly, a side impact resistant seat cushion includes a base plate. A foam pad and a fabric covering are disposed over the base plate. Laterally extending first and second beams are fixed to the base plate for rigidifying the base plate to increase resistance to buckling under side impact loading thereby improving passenger safety. The first and second beam are rigidly held in a parallel relationship above the top surface of the base plate by right and left brackets. In the case of a full length style bench seat, a bridge bracket may be provided to span and support intermediate gapped sections in each of the first and second beams. The first and second beams provide an added measure of column strength to the base plate during side impact situations where prior art base plates would have a tendency to buckle and fold. With the first and second beams, the base plate may be fabricated from thinner gauge (lighter and less expensive) sheet metal than prior art base plates and still provide greater resistance to buckling in the event of side impact loads.

21 Claims, 4 Drawing Sheets

VEHICLE SEAT CUSHION

TECHNICAL FIELD

The subject invention related to a vehicular seat cushion construction, and more particular toward an improved structural construction for base plate type seat cushions to enhance resistance to buckling under side impact loading.

BACKGROUND OF THE INVENTION

Vehicle seat assemblies typically include a seat cushion and an independent backrest cushion. These cushions are nearly always made with a foam pad core which is covered by a fabric or other material. According to the state of the art, the foam pad is supported in one of two ways. In one of these methods of supporting the foam pad, a frame is formed to attach an intermeshing or sinusoidal array of suspension wires, often times referred to as a "flexalator" suspension system to those skilled in the art. An example of this prior art method of supporting a foam pad in a seat cushion is shown in U.S. Pat. No. 3,328,020 to Flint, issued Jun. 27, 1967 and assigned to the assignee of the subject invention.

Sometimes, however, the foam pad is supported directly on a pan or tray-like base plate. The base plate is usually made from a sheet metal stamping, contoured to provide the necessary inclination and to mate with the floor in the passenger compartment. One disadvantage of seat cushions which use a base plate to support the cushion is observed during side impact conditions where the sheet metal base plate tends to buckle and crumple under the impact load. As a result, it has been a standard practice to fabricate the base plate from relatively thick and heavy gauge sheet metal.

SUMMARY OF THE INVENTION AND ADVANTAGES

The subject invention comprises a side impact resistant seat cushion for a vehicular seat assembly including a base plate having a top surface bounded by a left end and a right end and a front edge and a rear edge. A foam pad is disposed over the top surface of the base plate. A fabric covering is disposed over the foam pad and operatively connects the right and left ends and the front and rear edges of the base plate. The improvement of the invention resides in the base plate including a first beam extending laterally substantially from the left end to the right end thereof for rigidifying the base plate to increase resistance to buckling under side impact loading thereby improving passenger safety.

The first beam provides an added measure of column strength to the base plate during side impact situations where prior art base plates would have a tendency to buckle and fold. Inclusion of the first beam permits the base plate to be fabricated from thinner gauge (and hence lighter and less expensive) sheet metal than prior art base plates, while providing greater resistance to buckling in the event of a side impact load.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
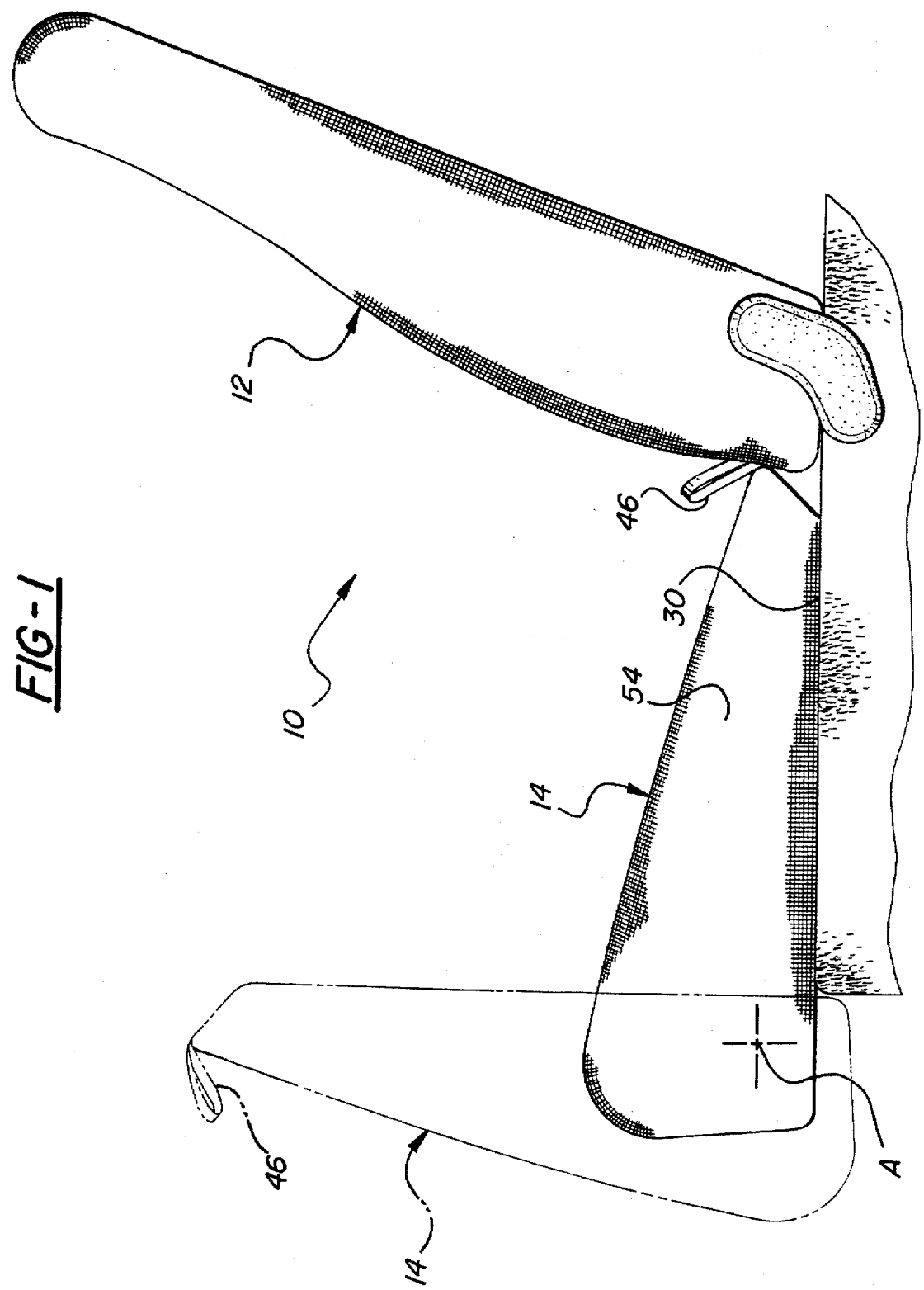
FIG. 1 is a side view of a vehicular seat assembly having a seat and a backrest cushion, with the seat cushion tipped upwardly to a stowed position.

Referring to the Figures, wherein like numerals indicate like or corresponding parts throughout the several views, a vehicular seat assembly is generally indicated at 10 in FIG. 1. The seat assembly 10 is of the type including a backrest cushion, generally indicated at 12, and a seat cushion, generally indicated at 14, disposed in a passenger compartment of the motor vehicle.

Figure 2:
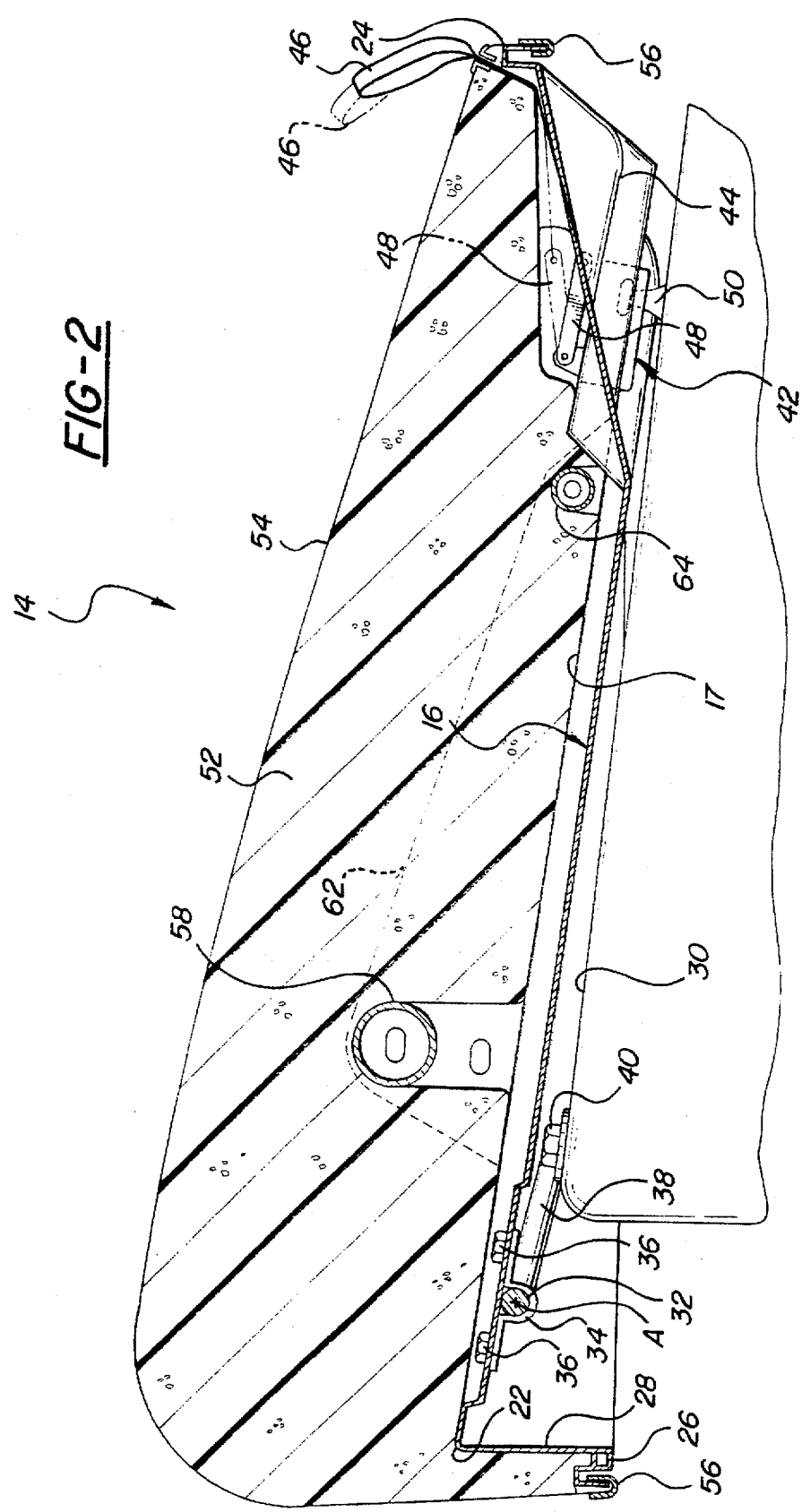
FIG. 2 is a cross-sectional view of the seat cushion.
Figure 3:
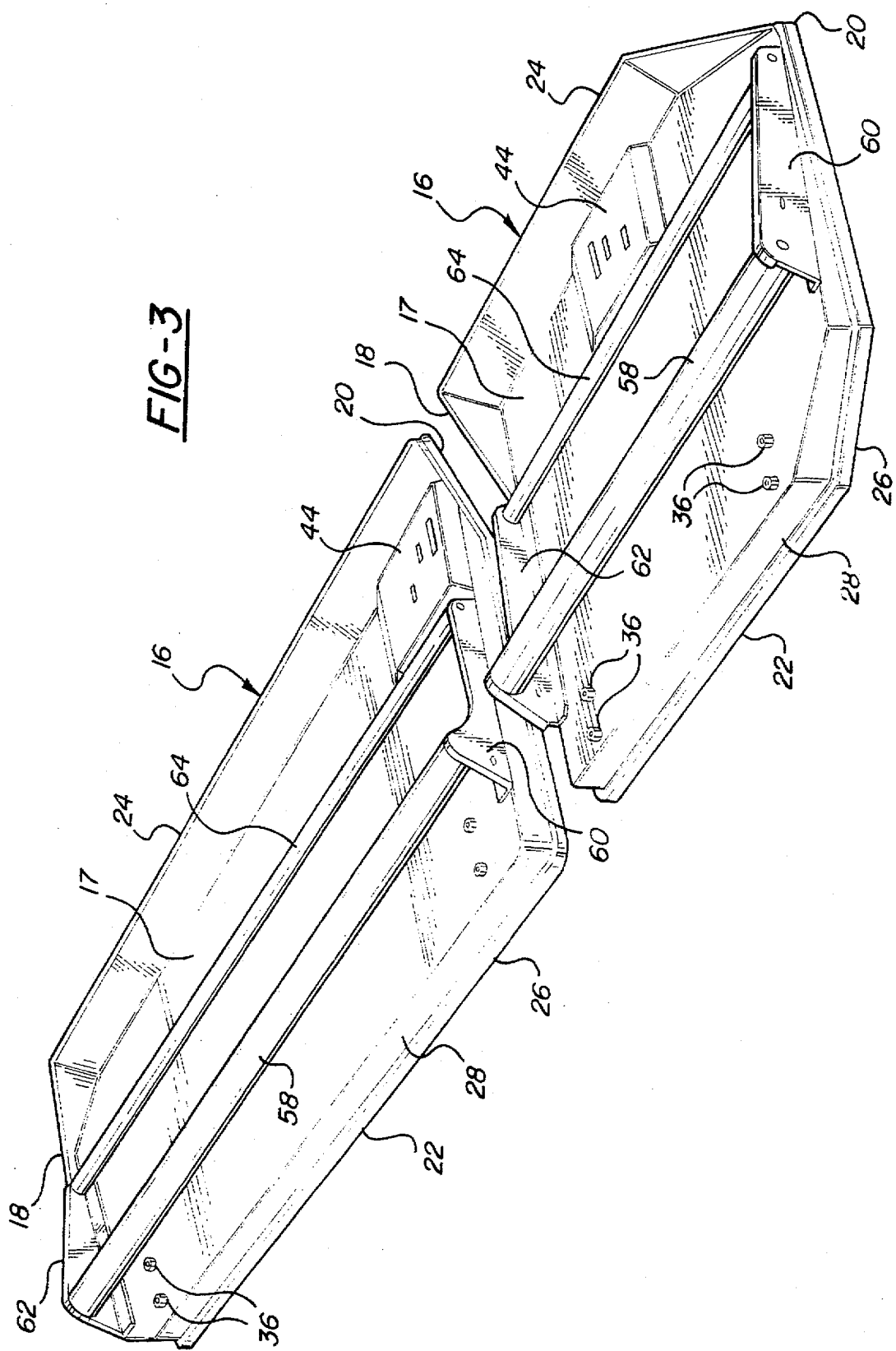
FIG. 3 is a perspective view of the 60/40 split base plate and respective first and second beams according to the subject invention.
Figure 4:
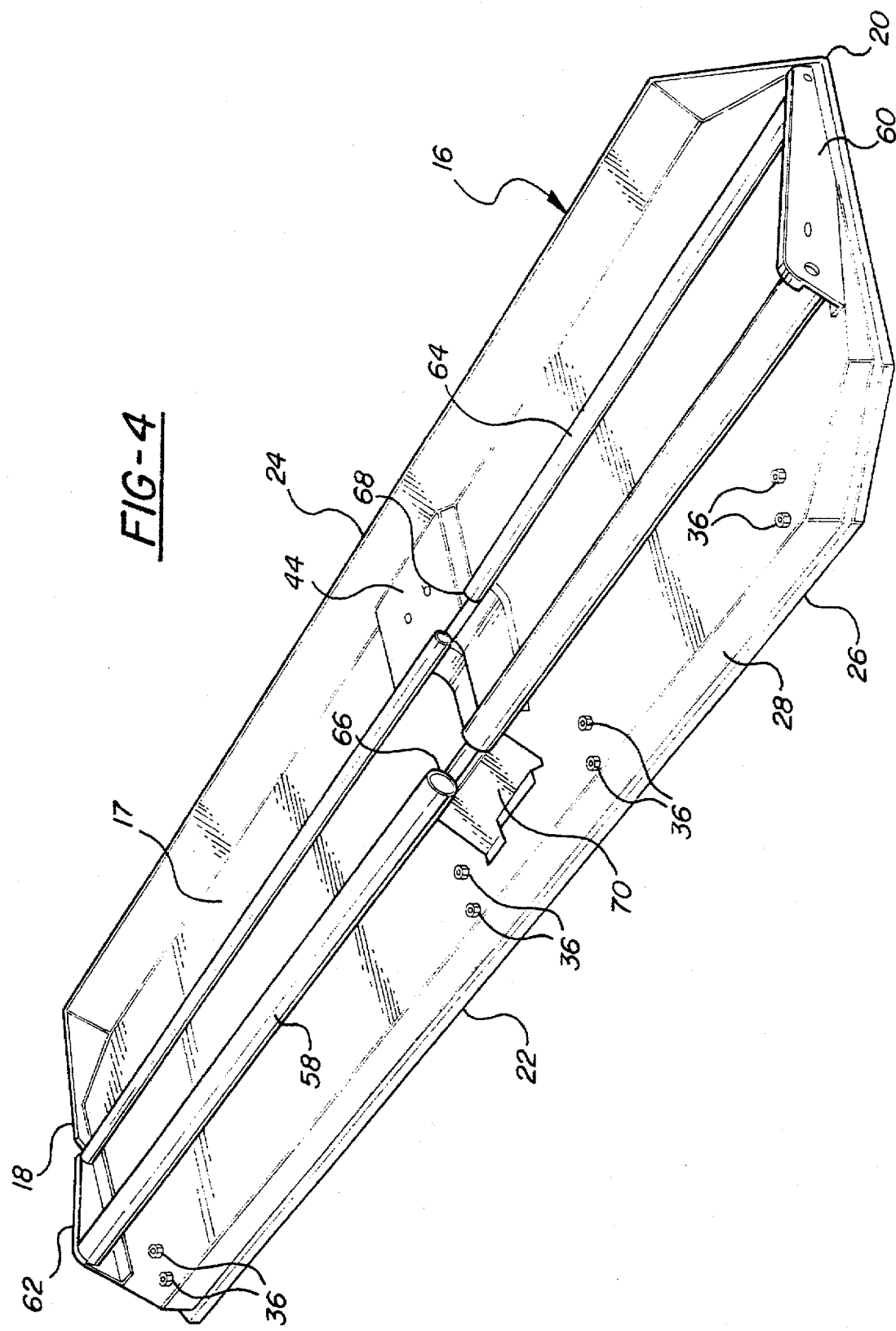
FIG. 4 is a perspective view as in FIG. 3 showing an alternative embodiment of the base plate as used in a full length bench style seat assembly.

Referring to FIGS. 2–4, the seat cushion 14 is shown including a base plate, generally indicated at 16, having a top surface 17 bounded by a left end 18 and a right end 20 and a front edge 22 and a rear edge 24. In FIG. 4, an alternative embodiment of the subject base plate 16 is used in a full-length bench style seat cushion 14, whereas the preferred embodiment shown in FIG. 3 is used in a 60/40 split style seat cushion 14. Those skilled in the art will readily appreciate that the subject invention is equally applicable to either version of seat cushion 14. The entire periphery of the base plate 16 is bounded by an inverted channel 26. A depending lip 28 extends along the front edge 22 of the base plate, and tapers to a termination point along each of the left 18 and right 20 ends of the base plate 16, giving the base plate 16 an forwardly inclining appearance in keeping with the angular tilt given to vehicular seat assemblies. The rear edge 24 is angled upwardly as best shown in the cross-sectional view of FIG. 2.

According to the preferred embodiment, a hinge extending from the 16 for pivoting the base plate 16 relative to We floor 30 in the passenger compartment of the vehicle about an imaginary horizontal axis A, as shown in FIG. 1. This is accomplished by rotatably securing an elongated shaft 32 to the underside of the base plate 16 with a pair of straps 34. The shaft 32 is coextensive with the axis A. The straps 34 are attached directly to the base plate 16 by fasteners 36. Feet 38 extend from opposite ends of the shaft 32 and are anchored to the floor 30 using suitable fasteners 40. Accordingly, the seat cushion 14 may be manually pivoted through an arc of approximately 90° about the stationary shaft 32. However, those skilled in the art will readily appreciate other pivoting and non-pivoting constructions of the seat cushion 14 without departing from the spirit of the subject invention.

The seat cushion 14 may be provided with a latch, generally indicated at 42 in FIG. 2, for releasably attaching the base plate 16 to the floor 30 so that the seat cushion 14 is restrained in a typical use position. The latch 42 is secured to the base plate 16 in a riser section 44 and includes a release strap 46 operatively connected to a release lever 48. The release lever 48 actuates a mechanism inside the latch 42 to unclasp a post 50 anchored to the floor 30. When a user pulls on the release strap 46, the seat cushion 14 is freed to pivot about the shaft 32 from the usual use position shown in solid in FIG. 1 to the vertical stowed position shown in phantom.

A foam pad 52 is disposed over the top surface 17 of the base plate 16. The foam pad 52 is custom molded to match the shape and contours of the top surface 17. A fabric covering 54 is disposed over the foam pad 52 and is operatively connected adjacent the left 18 and right 20 ends and the front 22 and rear 24 edges of the base plate 16. While those skilled in the art will readily appreciate various alternative methods of connecting the fabric 54 to the base plate 16, the method shown in FIG. 2 comprises stitching a barbed edging strip 56 to the peripheral edge of the fabric 54. This edging strip 56 is then seated into the inverted channel 26 formed about the periphery of the base plate 16. The fabric 54 may also be bonded to the foam pad 52. Along the rear edge 24 of the seat cushion 14, there is provided a gap between the fabric 54 and the base plate 16 through which the release strap 46 may pass to the exterior.

The base plate 16 includes a first beam 58 extending laterally substantially from the left end 18 to the right end 20 thereof for rigidifying the base plate 16 to increase resistance to buckling under side impact loading thereby improving passenger safety. In other words, the first beam 58 provides an added measure of column strength to the base plate 16 during side impact situations where prior art base plates would have a tendency to buckle and fold. With the first beam 58, it is possible to fabricate the base plate 16 from thinner gauge (and hence lighter and less expensive) sheet metal than prior art base plates and still provide greater resistance to buckling in the event of side impact loads.

The first beam 58 is substantially enveloped within the foam pad 52, between the top surface 17 of the base plate 16 and the fabric covering 54. Preferably, the first beam 58 is located in the region directly below an occupant's thigh, behind their knee, a region in which very little pressure is typically applied by the occupant's body weight. Therefore, it is not likely that the occupant will perceive the presence of the first beam 58. That is, there will be a sufficiently thick layer of foam pad 58 between the first beam 58 and the fabric 54 so that the occupant will not feel the first beam 58. The first beam 58 is preferably a tubular member having a generally circular cross-section. This tubular design is very efficient considering the strength to weight ratio of circular tubular columns, however those skilled in the art will readily appreciate other geometric shapes, both tubular and non-tubular, for the first beam 58.

The first beam 58 is held above the top surface 17 of the base plate 16 on one end by a right bracket 60 extending generally perpendicularly from adjacent the right end 20 of the base plate 16, and on the other end by a left bracket 62 extending generally perpendicularly from the left end 18 of the base plate 16. The right 60 and left 62 brackets are welded or otherwise fastened to the top surface 17 of the base plate 16, and are hidden from external view by the fabric 54.

In the case of the preferred embodiment shown in FIG. 3 where the seat cushion 14 is of the 60/40 split style, the right 60 and left 62 brackets may be shaped slightly different from one another, while still supporting the first beam 58 in a horizontal condition, substantially parallel to the top surface 17 of the base plate 16. However, in the alternative full-length bench style seat cushion 14 shown in FIG. 4, the right 60 and left 62 brackets may be shaped identical to one another. Those skilled in the art will appreciate that the specific shape of the right 60 and left 62 brackets are to a large extend a matter of design chose given the physical parameters of the particular vehicle.

Preferably, a second beam 64, spaced from and parallel to the first beam 58, is also supported between the fight 60 and left 62 brackets. The second beam 64 supplements the first beam 58 by providing even greater resistance to buckling in the event of side impact loading. As shown in FIGS. 2–4, the second beam 64 is tubular with a generally circular cross-section. However, the outer diameter of the second beam 64 is preferably much smaller than the outer diameter of the first beam 58. This size variation, together with the perpendicular spacing between the second beam 64 and the top surface 17 of the base plate 16 being less than the perpendicular spacing between the first beam 58 and the top surface 17, ensures that the occupant will not perceive the presence of the rigidifying first 58 and second 64 beams inside the seat cushion 14.

Referring to the alternative full-length bench style seat cushion 14 shown in FIG. 4, each of the first 58 and second 64 beams may include a gapped section 66, 68, respectively, along their lengths. According to this option, a bridge bracket 70 is provided for fixedly interconnecting the first 58 and second 64 beams to the top surface 17 of the base plate 16 adjacent the respective gapped sections 66, 68. Like the right 60 and left 62 brackets, the bridge bracket 70 may be welded or otherwise securely fastened to the top surface 17 of the base plate 16.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A side impact resistant seat cushion for a vehicular seat assembly, said seat cushion comprising:

a base plate having a top surface bounded by a left end and a right end and a front edge and a rear edge;

a foam pad disposed over said top surface of said base plate;

a fabric covering disposed over said foam pad and operatively connected adjacent said right and left ends and said front and rear edges of said base plate;

said base plate including a first beam extending laterally substantially from said left end to said right end thereof for rigidifying said base plate to increase resistance to buckling under side impact loading thereby improving passenger safety, said first beam disposed between said top surface of said base plate and said fabric covering;

said base plate further including a second beam spaced from and parallel to said first beam and disposed between said top surface of said base plate and said fabric covering; each of said first and second beams having an elevation measured perpendicularly from a respective portion thereof to said to top surface; said elevation of said second beam being less than said elevation of said first beam.

2. An assembly as set forth in claim 1 wherein said first beam is substantially enveloped in said foam pad.

3. An assembly as set forth in claim 2 wherein said first beam is tubular.

4. An assembly as set forth in claim 3 wherein said first beam has a generally circular cross-section.

5. An assembly as set forth in claim 4 further including a right bracket extending generally perpendicularly between said first beam and said right end of said base plate, and a left bracket extending generally perpendicularly between said first beam and said left end of said base plate.

6. An assembly as set forth in claim 5 wherein said second beam being supported between said right and left brackets.

7. An assembly as set forth in claim 6 wherein each of said first and second beams include a gapped section along the lengths thereof, further including a bridge bracket for fixedly interconnecting said first and second beams to said top surface of said base plate adjacent said respective gapped sections.

8. An assembly as set forth in claim 6 wherein said second beam is tubular.

9. An assembly as set forth in claim 8 wherein said second beam has a generally circular cross-section.

10. An assembly as set forth in claim 9 wherein said first beam has a predetermined cross-sectional outer diameter, and said second beam has a cross-sectional outer diameter less than said predetermined outer diameter of said first beam.

11. An assembly as set forth in claim 1 further including a hinge extending from said base plate for pivoting said base plate relative to a floor surface of the vehicle.

12. An assembly af set forth in claim 11 wherein said hinge includes an elongated shaft.

13. An assembly as set forth in claim 12 wherein said hinge includes a strap surrounding said shaft and operatively attached to said base plate.

14. An assembly as set forth in claim 13 wherein said hinge includes a foot extending from said shaft.

15. An assembly as set forth in claim 1 further including a latch for releasably attaching said base plate to a floor surface of the vehicle.

16. An assembly as set forth in claim 15 wherein said latch includes a release strap.

17. A side impact resistant seat cushion for a vehicular seat assembly, said seat cushion comprising:

a base plate having a top surface bounded by a left end and a right end and a front edge and a rear edge;

a foam pad disposed over said top surface of said base plate;

a fabric covering disposed over said foam pad and operatively connected adjacent said right and left ends and said front and rear edges of said base plate;

said base plate including beam means extending laterally substantially from said left end to said right end thereof for rigidifying said base plate to increase resistance to buckling under side impact loading thereby improving passenger safety; said beam means including a first beam substantially enveloped in said foam pad and a second beam parallel to and spaced from said first beam;

said first and second beams supported between a right bracket extending generally perpendicularly from said right end of said base plate, and a left bracket extending generally perpendicularly from said left end of said base plate; and wherein each of said first and second beams include a gapped section along the lengths thereof, further including a bridge bracket for fixedly interconnecting said first and second beams to said top surface of said base plate adjacent said respective gapped sections.

18. An assembly as set forth in claim 17 wherein said first beam is tubular and has a generally circular cross-section.

19. An assembly as set forth in claim 18 wherein said second beam is tubular and has a generally circular cross-section.

20. An assembly as set forth in claim 19 wherein said first beam has a predetermined cross-sectional outer diameter, and said second beam has a cross-sectional outer diameter less than said predetermined outer diameter of said first beam.

21. An assembly as set forth in claim 20 wherein the perpendicular spacing between said second beam and said top surface is less than the perpendicular spacing between said first beam and said top surface.

* * * * *